(12) United States Patent
Pope et al.

(10) Patent No.: US 12,452,365 B2
(45) Date of Patent: Oct. 21, 2025

(54) METHOD/SYSTEM TO IDENTIFY, EXTRACT, AND CONVEY KEY WORDS, PHRASES, AND MEANINGS IN SERVICE OF EMERGENCY COMMUNICATIONS (E.G., VOICE, TEXT, AND VIDEO)

(71) Applicant: Intrado Life & Safety, Inc., Longmont, CO (US)

(72) Inventors: Adan K. Pope, Riverside, IL (US); Michel Brkovic, St-Eustache (CA)

(73) Assignee: Intrado Life & Safety, Inc., Longmont, CO (US)

( * ) Notice: Subject to any disclaimer, the term of this patent is extended or adjusted under 35 U.S.C. 154(b) by 114 days.

(21) Appl. No.: 18/236,284

(22) Filed: Aug. 21, 2023

(65) Prior Publication Data
US 2025/0069386 A1 Feb. 27, 2025

Related U.S. Application Data

(63) Continuation of application No. 18/236,175, filed on Aug. 21, 2023.

(51) Int. Cl.
*G06V 10/94* (2022.01)
*G06V 10/40* (2022.01)
(Continued)

(52) U.S. Cl.
CPC ........ *H04M 3/42348* (2013.01); *G06V 10/40* (2022.01); *G06V 10/95* (2022.01); *G06V 20/52* (2022.01); *G06V 20/70* (2022.01); *G10L 15/1815* (2013.01); *G10L 15/22* (2013.01); *G10L 15/30* (2013.01); *H04M 3/5116* (2013.01); *H04N 7/183* (2013.01); *H04N 7/188* (2013.01); *H04N 23/61* (2023.01); *H04W 64/006* (2013.01); *G10L 2015/088* (2013.01); *H04M 2201/40* (2013.01); *H04M 2201/41* (2013.01)

(58) Field of Classification Search
CPC ........ G06V 10/95; G06V 10/40; G06V 20/70; G06V 20/52; H04N 23/61; H04N 7/183; H04N 7/188; G10L 15/1815; G10L 15/22; G10L 15/30; G10L 2015/088; H04M 3/5116; H04M 2201/40; H04W 64/006
USPC ......................................................... 348/143
See application file for complete search history.

(56) References Cited

U.S. PATENT DOCUMENTS 9,094,615 B2 * 7/2015 Aman ................. G06Q 30/02
10,170,114 B2 * 1/2019 Printz ................. G10L 15/32
(Continued)

OTHER PUBLICATIONS

Non-Final Office Action in U.S. Appl. No. 18/236,284 dated Aug. 19, 2025, 7 pages.

*Primary Examiner* — Nathan J Flynn
(74) *Attorney, Agent, or Firm* — Patent Capital Group

(57) ABSTRACT

A method includes receiving visual content of a physical location, the visual content identified by a content timestamp, the physical location identified by a spatial identifier; receiving audio content of a call; performing voice recognition on the call to extract a first audio symbol; receiving a first timestamp of the call, the first timestamp indicating a time at which the call was initiated or a time extracted from the call by voice recognition; and determining a feature in the visual content, at least in part based on the first audio symbol, the feature defined by a person, object, or situation.

20 Claims, 5 Drawing Sheets

(51) Int. Cl.
*G06V 20/52* (2022.01)
*G06V 20/70* (2022.01)
*G10L 15/18* (2013.01)
*G10L 15/22* (2006.01)
*G10L 15/30* (2013.01)
*H04M 3/42* (2006.01)
*H04M 3/51* (2006.01)
*H04N 7/18* (2006.01)
*H04N 23/61* (2023.01)
*H04W 64/00* (2009.01)
*G10L 15/08* (2006.01)

(56) References Cited

U.S. PATENT DOCUMENTS

| | | | |
|---|---|---|---|
| 11,922,930 B1* | 3/2024 | Leeds | G10L 15/1822 |
| 2011/0117878 A1 | 5/2011 | Barash et al. | |
| 2014/0337733 A1* | 11/2014 | Rodriguez | H04M 1/72469 |
| | | | 715/718 |
| 2020/0175961 A1* | 6/2020 | Thomson | G10L 15/28 |
| 2024/0070251 A1* | 2/2024 | Maizels | G06F 40/40 |

\* cited by examiner

METHOD/SYSTEM TO IDENTIFY, EXTRACT, AND CONVEY KEY WORDS, PHRASES, AND MEANINGS IN SERVICE OF EMERGENCY COMMUNICATIONS (E.G., VOICE, TEXT, AND VIDEO)

CROSS-REFERENCE TO RELATED APPLICATIONS

This Application is a continuation (and claims the benefit of priority under 35 U.S.C. § 120) of U.S. application Ser. No. 18/236,175, filed on Aug. 21, 2023, entitled "METHOD/SYSTEM TO IDENTIFY, EXTRACT, AND CONVEY KEY WORDS, PHRASES, AND MEANINGS IN SERVICE OF EMERGENCY COMMUNICATIONS (E.G., VOICE, TEXT, AND VIDEO)," Inventors Adan K. Pope and Michel Brkovic. The disclosure of the application is considered part of and is incorporated in its entirety by reference in the disclosure of this application.

BACKGROUND

Technical Field

This disclosure relates to semantic analysis of natural language data and, in particular, to identifying objects in an emergency scene, based on an emergency call.

Related Art

In one system, a user goes to a physical location and wears an augmented-reality-type device. This device recognizes objects at the physical location and compares the objects against the content of an emergency call.

BRIEF SUMMARY

In a first implementation of the present disclosure, a method includes receiving visual content of a physical location, the visual content identified by a content timestamp, the physical location identified by a spatial identifier; receiving audio content of a call; performing voice recognition on the call to extract a first audio symbol; receiving a first timestamp of the call, the first timestamp indicating a time at which the call was initiated or a time extracted from the call by voice recognition; and determining a feature in the visual content, at least in part based on the first audio symbol, the feature defined by a person, object, or situation.

A second implementation is the first implementation including receiving a location of the call, the location being a GPS location of a device that initiated the call or a location identified in the call by voice recognition.

A third implementation is the second implementation including identifying the visual content, based on the location of the call, the GPS location of the visual content, the content timestamp, and the first timestamp of the call.

A fourth implementation is any of the first through third implementations including determining a relationship between the first audio symbol and a second audio symbol, the second audio symbol extracted from the call by voice recognition.

A fifth implementation is any of the first through fourth implementations including annotating the visual content with an identifier of the feature to produce an annotation; and transmitting the visual content and the annotation to an emergency system.

A sixth implementation is any of the first through fifth implementations including receiving the spatial identifier, the spatial identifier including GPS coordinates of the physical location.

A seventh implementation is any of the first through sixth implementations including receiving a second timestamp of the call, the second timestamp identifying the other of the time at which the call was initiated or the time extracted from the call.

In an eighth implementation, an apparatus includes a network interface that receives visual content of a physical location and audio content of a call, the visual content identified by a content timestamp, the physical location identified by a spatial identifier; and a processor configured to perform voice recognition on the call to extract a first audio symbol, wherein a first timestamp of the call is received, the first timestamp indicating a time at which the call was initiated or a time extracted from the call by voice recognition, and the processor further is configured to determine a feature in the visual content, at least in part based on the first audio symbol, the feature defined by a person, object, or situation.

A ninth implementation is the eighth implementation in which the network interface receives a location of the call, the location being a GPS location of a device that initiated the call or a location identified in the call by voice recognition.

A tenth implementation is the ninth implementation in which the processor further is configured to identify the visual content, based on the location of the call, the GPS location of the visual content, the content timestamp, and the first timestamp of the call.

An eleventh implementation is any of the eighth through tenth implementations, in which the processor further is configured to determine a relationship between the first audio symbol and a second audio symbol, the second audio symbol extracted from the call by voice recognition.

A twelfth implementation is any of the eighth through eleventh implementations, in which the processor further is configured to annotate the visual content with an identifier of the feature to produce an annotation, and the network interface transmits the visual content and the annotation to an emergency system.

A thirteenth implementation is any of the eighth through twelfth implementations, in which the network interface receives the spatial identifier, the spatial identifier including GPS coordinates of the physical location.

A fourteenth implementation is any of the eighth through thirteenth implementations, in which the network interface receives a second timestamp of the call, the second timestamp identifying the other of the time at which the call was initiated or the time extracted from the call.

A fifteenth implementation is a computer-readable medium including instructions that, when executed by a processor, perform operations comprising: receiving visual content of a physical location, the visual content identified by a content timestamp, the physical location identified by a spatial identifier; receiving audio content of a call; performing voice recognition on the call to extract a first audio symbol; receiving a first timestamp of the call, the first timestamp indicating a time at which the call was initiated or a time extracted from the call by voice recognition; and determining a feature in the visual content, at least in part based on the first audio symbol, the feature defined by a person, object, or situation.

A sixteenth implementation is the fifteenth implementation, the operations further comprising: receiving a location of the call, the location being a GPS location of a device that initiated the call or a location identified in the call by voice recognition.

A seventeenth implementation is the sixteenth implementation, the operations further comprising: identifying the visual content, based on the location of the call, the GPS location of the visual content, the content timestamp, and the first timestamp of the call.

An eighteenth implementation is any of the fifteenth through seventeenth implementations, the operations further comprising: determining a relationship between the first audio symbol and a second audio symbol, the second audio symbol extracted from the call by voice recognition.

A nineteenth implementation is any of the fifteenth through eighteenth implementations, the operations further comprising: annotating the visual content with an identifier of the feature to produce an annotation; and transmitting the visual content and the annotation to an emergency system.

A twentieth implementation is any of the fifteenth through nineteenth implementations, the operations further comprising: receiving the spatial identifier, the spatial identifier including GPS coordinates of the physical location.

A twenty-first implementation is any of the fifteenth through twentieth implementations, wherein the network interface receives a second timestamp of the call, the second timestamp identifying the other of the time at which the call was initiated or the time extracted from the call.

A twenty-second implementation is an apparatus including means for receiving visual content of a physical location, the visual content identified by a content timestamp, the physical location identified by a spatial identifier, and for receiving audio content of a call; and means for performing voice recognition on the call to extract a first audio symbol, for receiving a first timestamp of the call, the first timestamp indicating a time at which the call was initiated or a time extracted from the call by voice recognition, and for determining a feature in the visual content, at least in part based on the first audio symbol, the feature defined by a person, object, or situation.

A twenty-third implementation is the twenty-second implementation, further comprising: means for receiving a location of the call, the location being a GPS location of a device that initiated the call or a location identified in the call by voice recognition.

A twenty-fourth implementation is the twenty-third implementation, further comprising: means for identifying the visual content, based on the location of the call, the GPS location of the visual content, the content timestamp, and the first timestamp of the call.

A twenty-fifth implementation is any of the twenty-second through twenty-fourth implementations, further comprising: means for determining a relationship between the first audio symbol and a second audio symbol, the second audio symbol extracted from the call by voice recognition.

A twenty-sixth implementation is any of the twenty-second through twenty-fifth implementations, further comprising: means for annotating the visual content with an identifier of the feature to produce an annotation; and means for transmitting the visual content and the annotation to an emergency system.

A twenty-seventh implementation is any of the twenty-second through twenty-sixth implementations, further comprising: means for receiving the spatial identifier, the spatial identifier including GPS coordinates of the physical location.

A twenty-eighth implementation is any of the twenty-second through twenty-seventh implementations, further comprising: means for receiving a second timestamp of the call, the second timestamp identifying the other of the time at which the call was initiated or the time extracted from the call.

A twenty-ninth implementation is a method including receiving audio content of a call associated with a physical location; performing voice recognition on the call to extract a first audio symbol; receiving visual content of the physical location; and determining a feature in the visual content, at least in part based on the first audio symbol, the feature defined by a person, object, or situation.

A thirtieth implementation is the twenty-ninth implementation, further comprising: triggering a camera to receive the visual content, at least in part based on a spatial identifier of the physical location.

A thirty-first implementation is the thirtieth implementation, further comprising: determining the spatial identifier, at least in part based on an initiating location of the call.

A thirty-second implementation is the thirtieth implementation, further comprising: performing voice recognition to extract a spoken location from the call; and determining the spatial identifier, at least in part based on the spoken location.

A thirty-third implementation is any of the twenty-ninth through thirty-second implementation, further comprising: transmitting the visual content and an identifier of the feature to an emergency system.

A thirty-fourth implementation is the thirty-third implementation, further comprising: receiving caller location information of the call; comparing location information of the physical location to the caller location information to produce an identified location; annotating the visual content with the identified location to produce an annotation; and transmitting the annotation to the emergency system.

A thirty-fifth implementation is any of the twenty-ninth through thirty-fourth implementations, further comprising: determining a relationship between the first audio symbol and a second audio symbol, the second audio symbol extracted from the call by voice recognition; and transmitting the relationship in an annotation.

A thirty-sixth implementation is an apparatus including a network interface that receives audio content of a call associated with a physical location; and a processor configured to perform voice recognition on the call to extract a first audio symbol, wherein the network interface receives visual content of the physical location, and the processor further is configured to determine a feature in the visual content, at least in part based on the first audio symbol, the feature defined by a person, object, or situation.

A thirty-seventh implementation is the thirty-sixth implementation, in which the processor triggers a camera to receive the visual content, at least in part based on a spatial identifier of the physical location.

A thirty-eighth implementation is the thirty-seventh implementation, in which the processor further is configured to determine the spatial identifier, at least in part based on an initiating location of the call.

A thirty-ninth implementation is the thirty-seventh implementation, in which the processor further is configured to perform voice recognition to extract a spoken location from the call and to determine the spatial identifier, at least in part based on the spoken location.

A fortieth implementation is any of the thirty-sixth through thirty-ninth implementations, in which the network interface transmits the visual content and an identifier of the feature to an emergency system.

A forty-first implementation is the fortieth implementation, in which the network interface receives caller location information of the call, the processor further is configured to compare location information of the physical location to the caller location information to produce an identified location, the processor further is configured to annotate the visual content with the identified location to produce an annotation, and the network interface transmits the annotation to the emergency system.

A forty-second implementation is any of the thirty-sixth through the forty-first implementation, in which the processor further is configured to determine a relationship between the first audio symbol and a second audio symbol, the second audio symbol extracted from the call by voice recognition, and the network interface transmits the relationship in an annotation.

A forty-third implementation is a computer-readable medium that includes instructions that, when executed by a processor, perform operations comprising: performing voice recognition on a call to extract a first audio symbol, wherein a network interface receives audio content of the call, the call associated with a physical location, and the network interface receives visual content of the physical location; and determining a feature in the visual content, at least in part based on the first audio symbol, the feature defined by a person, object, or situation.

A forty-fourth implementation is the forty-third implementation, in which the network interface triggers a camera to receive the visual content, at least in part based on a spatial identifier of the physical location.

A forty-fifth implementation is the forty-fourth implementation, the operations further comprising: determining the spatial identifier, at least in part based on an initiating location of the call.

A forty-sixth implementation is the forty-fourth implementation, the operations further comprising: performing voice recognition to extract a spoken location from the call; and determining the spatial identifier, at least in part based on the spoken location.

A forty-seventh implementation is any of the forty-third through forty-sixth implementations, in which the network interface transmits the visual content and an identifier of the feature to an emergency system.

A forty-eighth implementation is the forty-seventh implementation, the operations further comprising: comparing location information of the physical location to caller location information to produce an identified location, wherein the network interface receives the caller location information of the call; and annotating the visual content with the identified location to produce an annotation, wherein the network interface transmits the annotation to the emergency system.

A forty-ninth implementation is any of the forty-third through forty-eighth implementations, the operations further comprising: determining a relationship between the first audio symbol and a second audio symbol, the second audio symbol extracted from the call by voice recognition; and transmitting the relationship in an annotation.

A fiftieth implementation is an apparatus that includes means for receiving audio content of a call associated with a physical location; means for performing voice recognition on the call to extract a first audio symbol; means for receiving visual content of the physical location; and means for determining a feature in the visual content, at least in part based on the first audio symbol, the feature defined by a person, object, or situation.

A fifty-first implementation is the fiftieth implementation, further comprising: means for triggering a camera to receive the visual content, at least in part based on a spatial identifier of the physical location.

A fifty-second implementation is the fifty-first implementation, further comprising: means for determining the spatial identifier, at least in part based on an initiating location of the call.

A fifty-third implementation is the fifty-first implementation, further comprising: means for performing voice recognition to extract a spoken location from the call; and means for determining the spatial identifier, at least in part based on the spoken location.

A fifty-fourth implementation is any of the fiftieth through fifty-third implementations, further comprising: means for transmitting the visual content and an identifier of the feature to an emergency system.

A fifty-fifth implementation is the fifty-fourth implementation, further comprising: means for receiving caller location information of the call; means for comparing location information of the physical location to the caller location information to produce an identified location; means for annotating the visual content with the identified location to produce an annotation; and means for transmitting the annotation to the emergency system.

A fifty-sixth implementation is any of the fiftieth through fifty-fifth implementations, further comprising: means for determining a relationship between the first audio symbol and a second audio symbol, the second audio symbol extracted from the call by voice recognition; and means for transmitting the relationship in an annotation.

DETAILED DESCRIPTION

Figure 1:
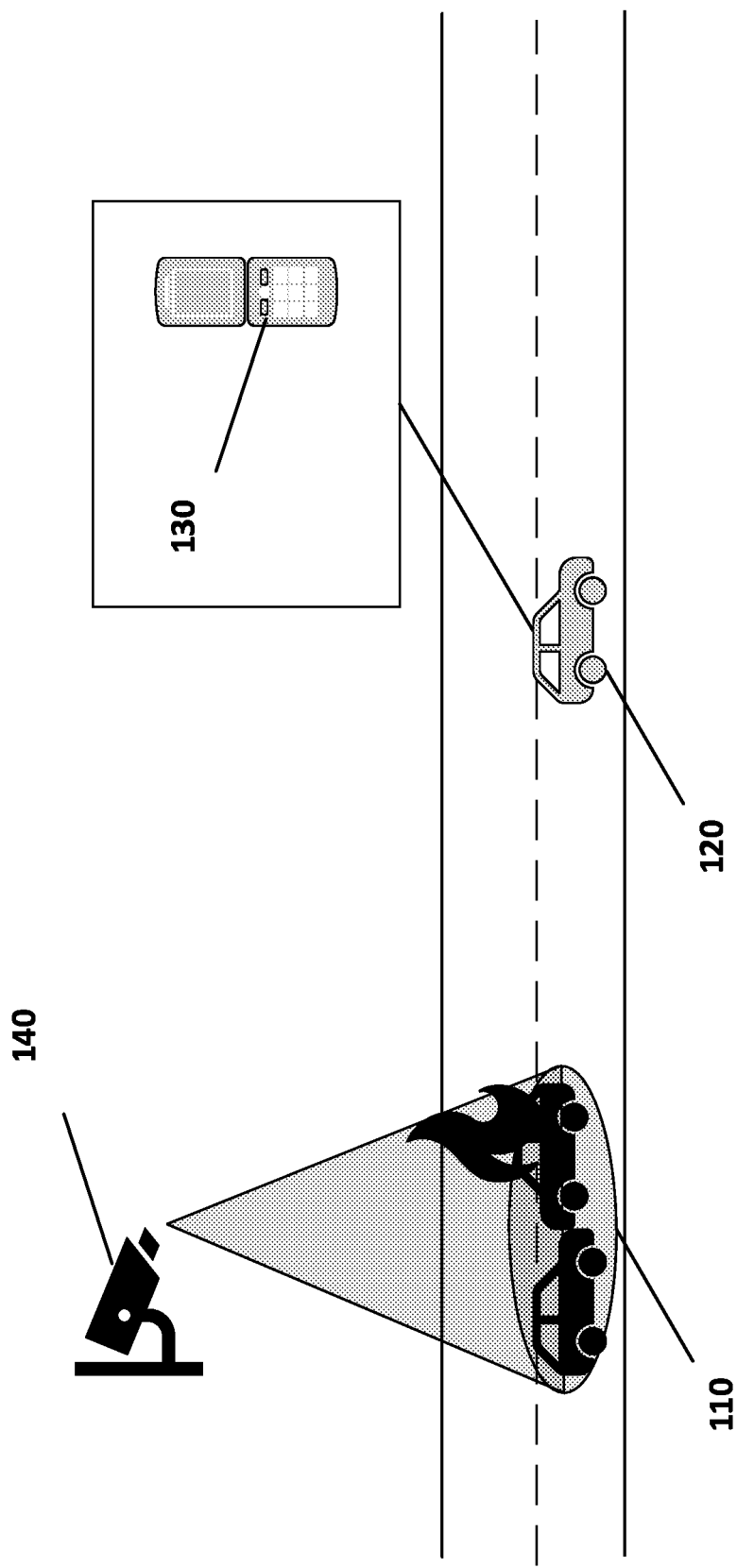
FIG. 1 illustrates an example emergency situation.

FIG. 1 illustrates an example emergency situation. In the illustrated situation, a car accident has occurred at location 110. In the illustrated car accident, one car has struck another and is on fire. Thus, an emergency call should be made to request both medical and fire assistance.

The driver of another car 120 witnessed the accident but did not stop to make an emergency call from their device 130. A camera 140 captures visual content over an area that includes location 110.

Eventually, the driver of the car 120 places an emergency call from device 130. Sometimes, the device 130 can provide its location with the emergency call. However, the car 120 continued at an unknown speed for an unknown period of time, after departing area 110. So, the position of the device 130 at the time of the emergency call might have little relevance to successfully identifying the location 110 at which the accident occurred.

An emergency call center that receives the call might be able to access the camera 140. However, the emergency call center would not be able to do so, based on the location of the device 130 at the time of the call.

Figure 2:
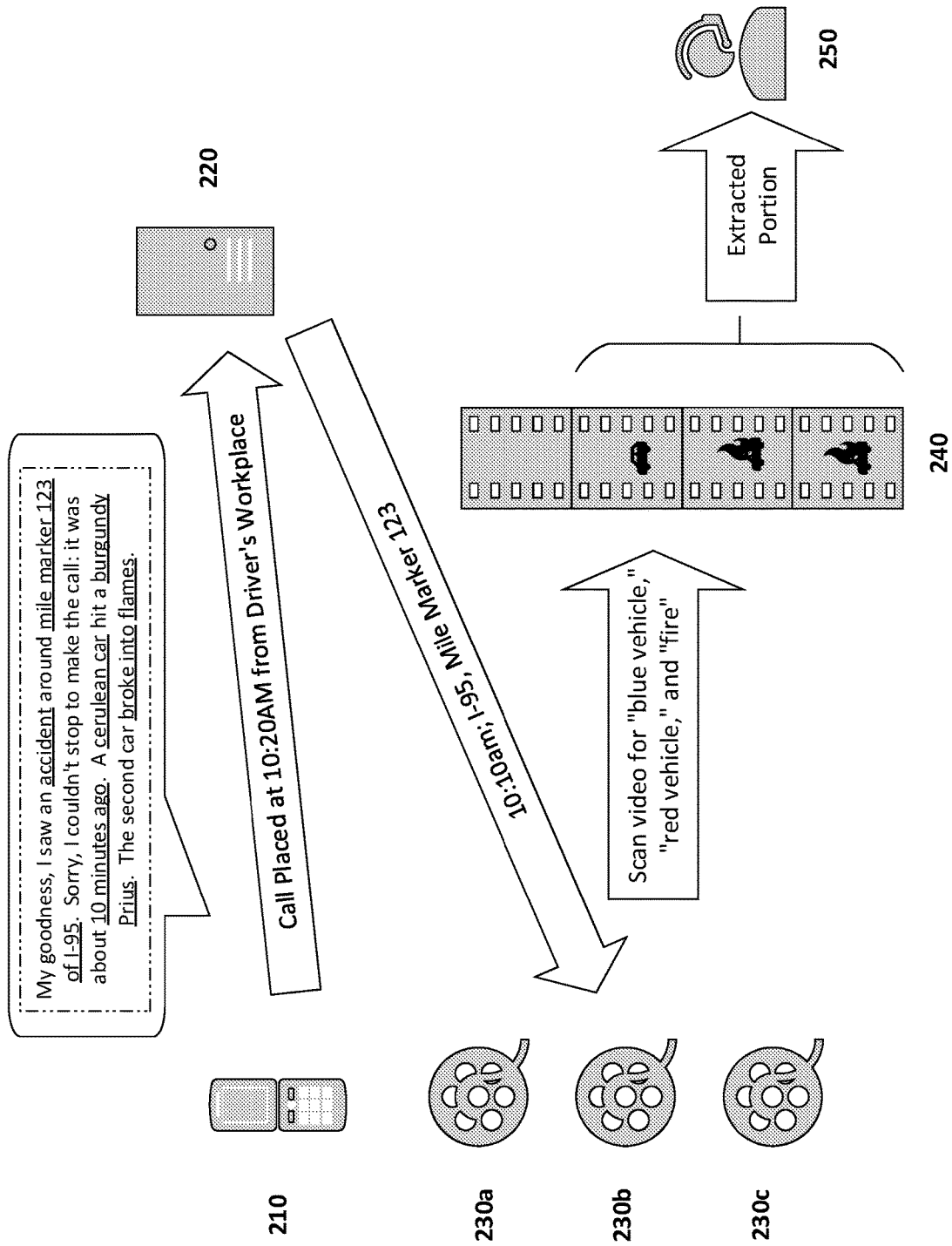
FIG. 2 illustrates an identification system, according to an implementation of the present disclosure.

FIG. 2 illustrates an identification system, according to an implementation of the present disclosure. The identification system includes a device 210, a server 220, visual content 230a, 230b, and 230c, frames 240, and a calltaker 250. In some implementations, the device 210 is the device 130 from FIG. 1, and the calltaker 250 is at the call center discussed in connection with FIG. 1.

Returning to the example of FIG. 2, the device 210 places a call at 10:20 am from the driver's workplace. In various implementations, the call can be placed directly to the server 220. The call also can be placed to the call center and redirected to and/or intercepted by the server 220. The call center also can include or otherwise incorporate the server 220, such that the server 220 is a part of a frontend for the call center.

Because emergency callers frequently are under stress when they make emergency calls, the content of the calls tends to be unfocused. People sometimes make comments that are not germane to the emergency response. They sometimes make an effort to assist by providing high levels of detail. Although these high levels of detail can assist in the right circumstances, callers sometimes use precise, but potentially inaccurate, terms (e.g., "cerulean"), not to mention that callers sometimes make mistakes.

Thus, in many implementations, the server 220 performs voice recognition on the call to determine key words and/or phrases in the call. For example, a transcript of the call might be "My goodness, I saw an accident around mile marker 123 of I-95. Sorry, I couldn't stop to make the call: it was about 10 minutes ago. A cerulean car hit a burgundy Prius. The second car broke into flames."

The server 220 can determine the call includes audio symbols like "accident," "mile marker 123 of I-95," "10 minutes ago," "cerulean car," "burgundy Prius," and "flames." In some implementations, the server can determine a primary-secondary relationship such as between "accident" and "flames." In multiple implementations, the server can determine a subject-verb-direct object relationship between "cerulean car," "hit," and "burgundy Prius." Naturally, other implementations are possible.

Further, the server 220 can standardize the audio symbols. For example, callers sometimes use overly precise language. The language might be misremembered, subjective, or not reflect the image recorded by a camera, due to experiencing different lighting conditions or filters. Therefore, some implementations standardize words to a more common word (e.g., "cerulean" to "blue," "burgundy" to "red," "Prius" to "car," "flames" to "fire"). The server 220 can determine these more common words, based on a thesaurus that covers colors, vehicles, structures, rooms, facial features, articles of clothing, events, and so on.

In many implementations, the call itself includes information such as the initiating location at which the call is made and the initiating timestamp that represents the time at which the call is made. In some implementations, the initiating timestamp can instead be the time at which the server 220 receives the call. In FIG. 2, the initiating timestamp is 10:20 AM.

Further, the server 220 can determine a relative time of the accident, based on the spoken timestamp of "10 minutes ago" and the initiating timestamp of 10:20 AM. In the example of FIG. 2, the server 220 determines the relative time of the accident is 10:10 am.

In addition, the server 220 can determine the spoken location is "mile marker 123 of I-95."

The server 220 can access (e.g., receives) visual content 230a, 230b, and 230c. The visual content 230a, 230b, and 230c can differ or be similar in time, format (e.g., photograph vs. video), photographing location, and location photographed. In many implementations, the visual content is associated with a timestamp at which the location was photographed and a primary location that is being photographed.

Thus, the server 220 can determine which of visual content 230a, 230b, and 230c is associated with the relative time of 10:20 am and the spoken location of "I-95, mile marker 123." In other implementations, the server 220 can determine which of the visual content is associated with the initiating location, initiating timestamp, spoken timestamp, spoken location, relative location, and/or relative timestamp. In several implementations, the server 220 searches the visual content 230a, 230b, and 230c for all such combinations.

In the example of FIG. 2, the server 220 determines that visual content 230b is associated with the relative time 10:20 am and the spoken location I-95, mile marker 123. Thus, the server 220 scans the visual content 230b for some or all of the audio symbols in the call. As shown in FIG. 2, the server 220 scans the visual content 230b for a "blue vehicle," "red vehicle," and "fire."

As shown in FIG. 2, the "red vehicle" appears in the second of four frames 240 of visual content and is aflame in the third and fourth frames 240 of the visual content. Thus, the server 220 can recognize these frames efficiently, because the server 220 could search only one of visual content 230a, 230b, and 230c for a particular object, rather than first trying to recognize every object in visual content 230a, 230b, and 230c.

The server 220 then can extract the second, third, and fourth frames 240 and send them to response personnel, such as the calltaker or a first responder.

Select implementations can determine that particular key words mean something together, based on a timeline, for example. These timeline relationships can be simultaneous, successive, or with a delay.

In various implementations, the device 210 can be a desktop computer or a mobile device, such as a smartphone, a smartwatch, tablet computer, phablet, or laptop. In many implementations, the server 220 can be a computer. The device 210 and the server 220 are discussed in more detail in connection with FIG. 5.

Figure 3:
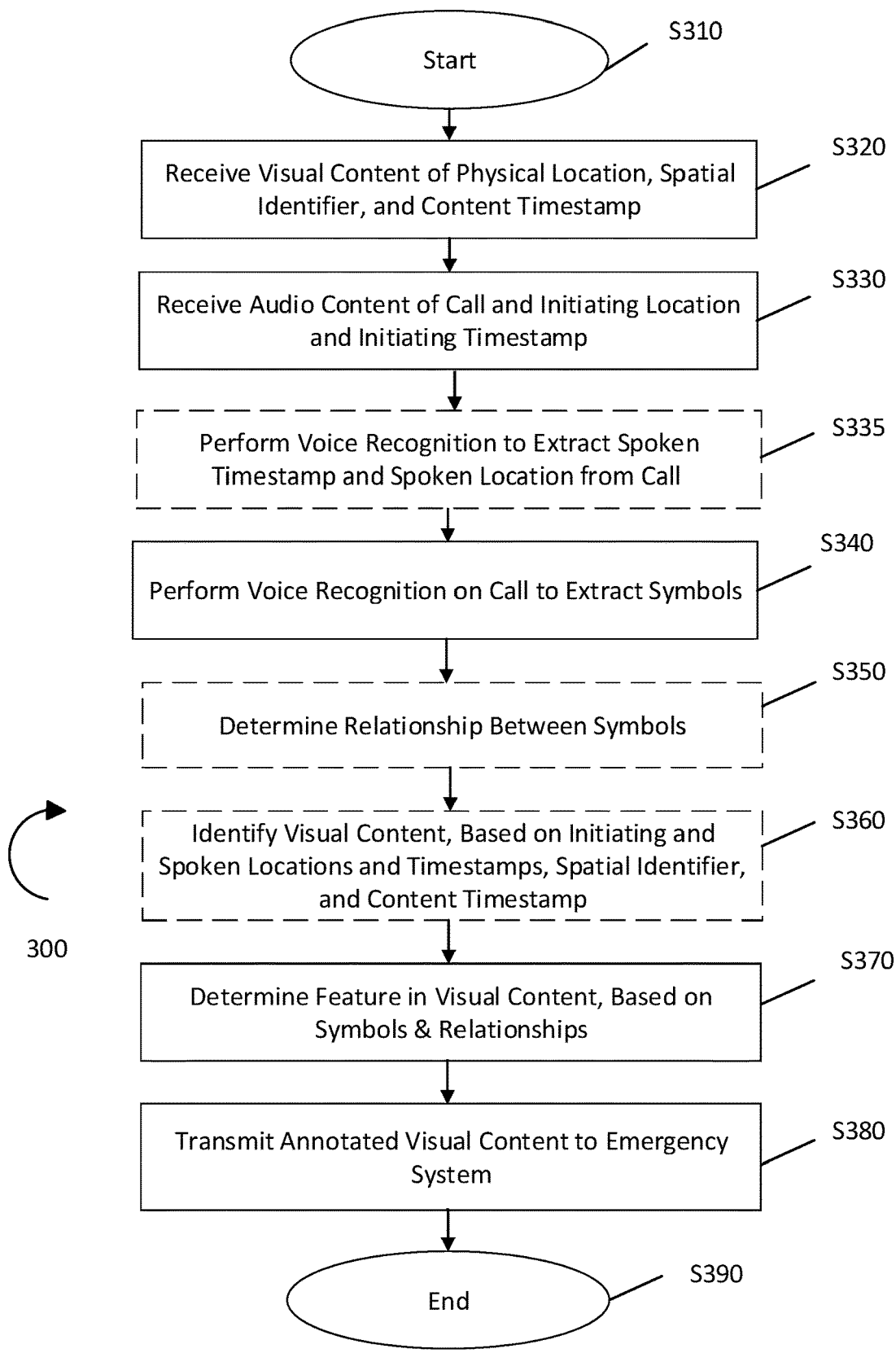
FIG. 3 illustrates an algorithm for identifying key words in service of emergency communications, according to an implementation of the present disclosure.

FIG. 3 illustrates an algorithm 300 for identifying key words in service of emergency communications, according to an implementation of the present disclosure. The algorithm begins at S310 and advances to S320.

In S320, the server 220 receives visual content of a physical location, a spatial identifier, and a content timestamp. The visual content can be received from a visual information collection device, such as a camera, an infrared camera, or a heat map recorder.

Although FIG. 3 illustrates S320 as a single occurrence, the server can receive data, such as visual content, a spatial identifier, and a content timestamp, relating to plurality of physical locations. Thus, the server can receive this data from the plurality of physical locations continuously or discretely, in serial or in parallel, as a stream or as discrete files. In select implementations, the data can be received from multiple cameras of a same location, e.g., to obtain a different perspective or for redundancy.

The physical location is, for example, location 110 illustrated in FIG. 1. The size and shape (e.g., perimeter) of the location is not limited. In some implementations, the physical location is defined by a circle with a radius of 10 feet. Implementations can define physical locations of different size, based on different environments (e.g., larger sizes outdoors, smaller sizes indoors).

The spatial identifier can be or include any identifier for the physical location. Thus, the spatial identifier can be or include global navigation satellite system (GNSS) coordinates, a postal address, a location along a road (e.g., mile marker, intersection, or landmark), a building identifier (e.g., "city hall"), or even an identifier within a building (e.g., "kitchen"). Because the server 220 can use an arbitrary identifier to identify the location, the spatial identifier typically includes information that can be communicated directly to emergency personnel (e.g., a postal address) or to a computerized system that coordinates the emergency response (e.g., GNSS coordinates). The GNSS system can be or comply with the Global Positioning System (GPS), Global Navigation Satellite System (GLONASS), BeiDou Navigation Satellite System, Galileo, Quasi-Zenith Satellite System (QZSS), or the Indian Regional Navigation Satellite System (IRNSS), as examples.

The content timestamp is the time at which the visual content was captured by a camera. The content timestamp can be in any format (e.g., 12-hour clock or 24-clock). If the visual content is a discrete video, the content timestamp can represent the time at which the recording began and/or the time at which the recording ended.

The electronic file containing the visual content can include the spatial identifier and/or content timestamp as metadata. In some implementations, the spatial identifier and/or content timestamp are included in the file name of the file. In some implementations, the spatial identifier and/or content timestamp can be located in a separate file that references the electronic file containing the visual content.

The algorithm 300 then advances to S330.

In S330, the server 220 receives audio content of a call, such as an emergency call. As discussed previously, the server 220 can receive the emergency call by intercepting the call, having the call redirected to the server 220, or being part of the emergency call center. In some implementations, the server 220 can receive a recording of an emergency call from an emergency call center.

The server 220 can also receive the initiating location and/or the initiating timestamp of the emergency call. The initiating location and/or the initiating timestamp can be included in the emergency call itself, such as multiplexed into the signal or as part of the VOIP transmission that includes the call.

As discussed previously, the initiating location can be or include GPS coordinates, for example.

In some implementations, the server 220 checks the current time in response to receipt of the emergency call and uses the current time as the initiating timestamp, rather than a timestamp that might (or might not) be included in the call itself. Similarly, in at least one implementation, the server 220 can send out one or more signals in response to a receipt of the emergency call, and the signals can be used to triangulate the calling device (e.g., device 130 or device 210).

The algorithm 300 then advances to S335.

In S335, the server 220 optionally performs voice recognition on the emergency call to extract a spoken timestamp and/or a spoken location. The server 220 can use voice recognition technology to recognize various key words and/or phrases spoken during the emergency call. These key words and/or phrases can be or include absolute times (e.g., "3:54 pm"), common names (e.g., "dawn"), and/or relative times (e.g., "fifteen minutes ago"). The algorithm 300 then advances to S340.

In S340, the server 220 performs voice recognition on the emergency call to extract audio symbols. The audio symbols are loosely defined as key words and/or phrases. This operation can be based on natural language processing techniques.

The server 220 can produce a transcript of the emergency call based on the voice recognition. The server 220 then can produce an annotation, described in more detail below, that includes the transcript. As used herein, "annotating" is inclusive of any type of reading, writing, storing, or communicating of information, based on any communication design.

The algorithm 300 then advances to S350.

In S350, the server 220 optionally can determine the relationship between the audio symbols. Such a relationship can be established by, for example, the grammatical role of a word in a sentence. For example, the role of a noun as a subject, indirect object, or direct object can establish such a relationship.

In another example, the relationship is established by a model that reflects potential elements of interest. For example, the caller might lead with the primary issue, possibly as a response to the calltaker asking, "What's your emergency?" In the example of FIG. 2, the call begins with "accident." Thus, the model can consider relationships to other key words and/or phrases, such as "flames" or "injury." Thus, the model can reflect that a primary element of "accident" to secondary elements such as "car" and "flames" might present different visual from a primary element of "flames" to a secondary element like "car."

The algorithm 300 then advances to S360.

In S360, the server 220 optionally identifies the visual content, based on the initiating and spoken locations, initiating and spoken timestamps, the spatial identifier, and/or the content timestamp.

In various implementations, the server 220 determines a relative location or timestamp, based on the initiating and spoken location or the initiating and spoken timestamp. In such an implementation, the server 220 can determine the visual content based on the relative location and/or relative timestamp.

The algorithm 300 then advances to S370.

In S370, the server 220 determines a feature in the visual content, based on the audio symbols and, optionally, the determined relationships. For example, the server 220 can search the visual content for a "blue vehicle," a "red vehicle," and "fire," using an image recognition technique. Because this search is informed by the emergency call, the image recognition can be conducted more efficiently, contrasted to the sever recognizing objects on their own.

In some implementations, features can be determined based on text words and/or phrases in the visual content. For example, such feature might be an object like a street name, a traffic sign, or license plate. The feature can be a person that might be identified by name or physical description. The feature can be a relationship that can be identified by, for example, a quasi-legal definition (e.g., a person setting a fire as "arson").

The server 200 can produce an annotation for the visual content, where the annotation can include the feature.

In some implementations, the server 200 can consider the determined objects in the visual content to be visual symbols. Thus, the server 200 can also determine a relationship between the visual symbols and/or between the audio symbols and the visual symbols.

The algorithm 300 then advances to S380.

In S380, the server 220 can transmit the visual content and annotation to the emergency system. The annotation can include, for example, extraction of at least frames that include the object(s) determined in S370. The extraction can include additional frames before and after the frames including the identified object. For example, the extraction can include the preceding and succeeding duration (e.g., 10 seconds) or number of frames to provide context for the extracted events. The annotation can include a transcript of the emergency call and/or an identifier of the determined objects (e.g., text descriptions like "blue vehicle" or metadata tags), symbols, and/or relationships.

The annotation itself can be in the same file as the visual content or a separate file. Annotations for the same visual content can be in separate files or in one file, as well as other possible file management implementations.

The annotation can also contain data structures, such that individual descriptions (e.g., "fire") are associated with timestamps or text, for example. Thus, a device that receives the annotated visual content can search for the time at which the fire occurs or a license plate of the car that is on fire, for example.

In various implementations, the emergency system can be a calltaker, a first responder, and/or personnel at the scene of the location.

Thus, a person who receives the annotated visual content can review the visual content in the context of the emergency call.

The algorithm 300 then advances to S390.

In S390, the algorithm 300 ends.

The operations of the algorithm 300 are merely illustrative and can be performed in many alternative ways. For example, although the algorithm 300 illustrates S330 occurring after S320, the present disclosure is not limited to such an implementation. Indeed, in various implementations, S320 can be performed after S330 (and even S335-S360).

Further, although the algorithm 300 illustrates the voice recognition and extraction in S335 occurring before S340, some implementations can perform the voice recognition and extraction at the same time or in the reverse order.

In various implementations, it might be unnecessary to identify the visual content in S360. For example, the server 220 can achieve the more efficient object identification within the visual content, even if the server 220 does not identify the visual content from among a plurality of visual content. Further, the server 220 can be implemented in a system in which the server 220 has access to a limited number of visual content (e.g., a single stream or recording from a current day). Thus, the identification in S360 is optional.

Figure 4:
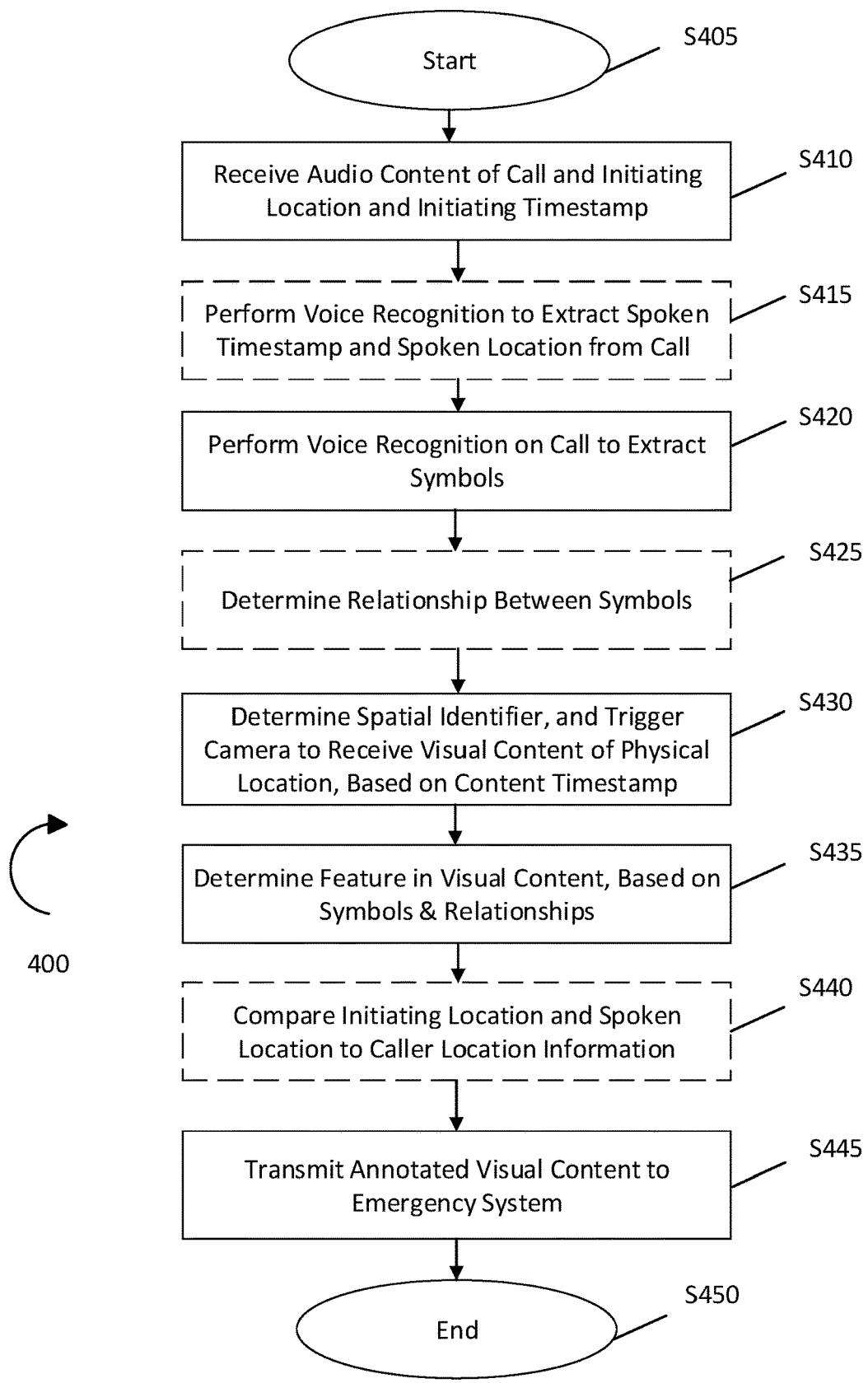
FIG. 4 illustrates an algorithm for identifying key words in service of emergency communications, according to another implementation of the present disclosure.

FIG. 4 illustrates an algorithm 400 for identifying key words in service of emergency communications, according to another implementation of the present disclosure.

The algorithm 400 begins at S405 and proceeds to S410.

In S410, the server 220 receives an emergency call, an initiating location, and an initiating timestamp. S410 is similar to S330, and further detail is omitted. The algorithm 400 then advances to S415.

In S415, the server 220 optionally extracts a spoken timestamp and/or a spoken location from the emergency call. S415 is similar to S334, and further detail is omitted. The algorithm 400 then advances to S420.

In S420, the server 220 performs voice recognition on the emergency call to extract audio symbols. S420 is similar to S40, and further detail is omitted. The algorithm 400 then advances to S425.

In S425, the server 220 optionally determines a relationship between the symbols. S425 is similar to S350, and further detail is omitted. The algorithm 400 then advances to S430.

In S430, the server 220 can determine a spatial identifier, based on the initiating location and/or the spoken location. For example, the spatial identifier can be determined to be coordinates included in the emergency call. Alternatively, the spatial identifier can be, or be based on, a spoken location (e.g., "mile marker 123 of I-95").

In various implementations, the server 220 determines a relative location, based on both the initiating location (e.g., GPS coordinates included in the call) and a spoken location (e.g., "a mile south of here"). Thus, the server also can determine the spatial identifier based on the relative location.

In several implementations, the server 220 can access a database or other data structure that associates physical locations with spatial identifiers.

The server 220 then can trigger a camera at the spatial identifier to receive visual content of the physical location (e.g., location 110). In several implementations, the server 220 transmits a visual content request to a camera (e.g., camera 140), and the camera transmits a visual content response including the visual content. In some implementations, the server 220 instead transmits the visual content request to a server that stores visual content from the camera, and that server replies with the visual content response.

In many implementations, the server 220 can transmit the visual content request to have the current visual content returned. In some implementations, the server 220 can transmit a content timestamp, such as when the camera or the server storing visual content from the camera stores previous visual content (e.g., from five seconds ago). In such an implementation, the camera and/or the server can access the relevant visual content, based on the timestamp.

The content timestamp can be based on the initiating timestamp and/or the spoken timestamp. In some implementations, a relative timestamp is determined based on the initiating timestamp (e.g., 12:54 pm) and a spoken timestamp (e.g., "20 minutes ago"). In such an implementation, the content timestamp can be based on the relative timestamp.

The algorithm 400 then advances to S435.

In S435, the server 220 determines objects in the visual content, based on the symbols determined in S420 and/or the relationships optionally determined in S425. S435 is similar to S370, and further detail is omitted. The algorithm 400 then advances to S440.

In S440, the server 220 optionally compares the initiating location and the spoken location to caller location information.

In several implementations, the caller location information can be an automatic location identification (ALI). PSAPs can retrieve ALIs from a database that links telephone numbers to locations. Especially in the case of a mobile telephone, the location in the database is not necessarily the location at which the call is made, nor the location of the event (e.g., location 110). Therefore, the server 220 can compare the initiating location and/or the spoken location to the ALI. If the server 220 determines the initiating location and/or spoken location is different (or simply more accurate and/or precise) than the ALI, then the server 220 can produce an identified location that is the different, more accurate, and/or more precise location than the ALI. The server 220 can add the identified location to the annotation of the visual content.

The algorithm 400 then advances to S445.

In S445, the server 220 transmits the visual content and the annotation to the emergency system (e.g., PSAP, first responder, calltaker). S445 is similar to S380, and further detail is omitted. The algorithm 400 then advances to S450.

In S450, the algorithm 400 ends.

In optional S440, the server 220 optionally can extract a spoken telephone number from the call using voice recognition, and compare the spoken telephone number to the automatic number identification (ANI) of the emergency call. In some situations, the ANI is incorrect. In addition, a caller might want a future call sent to a different telephone number (e.g., if the battery in the calling phone is dying, or if the calling phone is borrowed from a stranger). In such a situation, the server 220 can add the spoken telephone number to the annotation of the visual content.

To review, in one implementation, a system receives visual content (e.g., image or video) of at least one physical location. The system also receives an emergency call. The system performs voice recognition on the emergency call to glean key words and/or phrases. The key words can identify, for example, objects, people, and situations. The system then searches for those objects, people, and situations in the visual content. The system can then annotate (e.g., in a separate text file) the visual content and transmit the visual content and annotation to an emergency system. Thus, the emergency system can receive visual content relevant to an emergency call. Further, because the visual recognition is performed relative to a limited number of keywords/phrases (as opposed to all potential keywords), some implementations can achieve a more accurate image recognition or produce visual content potentially more relevant to the emergency call.

In addition, this system permits efficiently scanning videos of a plurality of locations in an area (e.g., within an emergency jurisdiction).

The visual content and the call can be live (e.g., streamed) or recorded (e.g., in their entirety, prior to receipt by the system).

In many implementations, the visual content file includes or is associated with metadata. The association can be established via a same or similar name of the metadata file to the visual content file. The association can be established by, e.g., identical names, such that the filenames differ only in extension. Other implementations establish the association differently, such as the name of the metadata file including a hash value or timestamp of the visual content file.

The metadata can include timestamps and/or an indication of a position. The position indication can include geolocated (e.g., global positioning system (GPS)) coordinates or another (e.g., a descriptive) indication of a position. The indicated position can be the location of the camera that produced the visual content or the location of which the camera produced the visual content.

Implementations of the present disclosure can extract symbols (e.g., key words or phrases and meanings) from a telephone call, such as an emergency call.

The symbol extraction can enable faster and more accurate processing of information contained in either the emergency call or in visual content related to the emergency call. Such processing can enable more direct translation of the content of the call, as well as a faster and more accurate response to an emergency.

Various implementations of the present disclosure can implement a global emergency request and response learning model from the collected data.

Thus, in one implementation, a learning-model-driven AI system collects and organizes the symbols on the basis of a timeline and geo-location relationship. The AI system can take these data inputs, create scene collections, relate them chronologically, and form an assessment of meaning of the scene.

Further, the system assigns a relevance score to the symbols and assigns a data attribute on non-relevant items for ongoing assessment and display of the scene. This tagging system too is informed by feedback and learns and becomes more accurate over time.

Thus, the system can create and manage aggregations of items on the basis of a time series and of a geolocation. The system can process these item collections to create derived situational awareness and imputed meaning. The system can contribute these collections of data to a learning model, and the learning model can learn, over time, the fit of a given situation (e.g., a collection of collections) to the learned modeled assessment.

In some implementations, the system can create a confidence scoring model that weighs the current symbols in aggregation for relevance and can create a confidence of a current scene against a model representing a fit to a particular meaning/

In various implementations, the system can gain input from skilled model trainers (e.g., people) that provide input to the learning model about the meaning of a scene versus the imputed meaning.

In select implementations of the system, information can be associated with an incident ID, a source type (e.g., a device, a person's phone, camera, text, or watch), a time, a date, and a location. This information can be stored in an immutable data repository for future use in evidence.

With this learning informed scene assessment, the system can create a brief statement about the scene that can be transmitted to emergency communications centers and first responders. The forms of this description can be written (e.g., text) and visual.

In one example, the system can receive a file including 2 hours of video. For the first 1 hour and 32 minutes, the system can determine there is no meaningful information to emergency response or first responders.

The system can perform this determination based on entropy, for example. The entropy of the video image can be important: most camera footage of a fairly routine scene looks routine. A change, the degree of the change, and images, symbols, or objects present at the time of change can indicate applicability and value of the time period as well.

At 1 hour and 33 minutes into the video, three people appear and are described in term of gender, race, physical attributes, and clothing. Further, a motorcycle is in the scene, and so are a number of weapons.

The system has also been provided a 911 voice call file of this same time at a location within 50 yards proximate to the location of the video. The 911 call states burglary and provides identifying information about a number of people, the items they have in their possession, and their actions.

From these inputs (e.g., similar number of people, similar items/weapons), the system imputes there is break-in at a home and associates these symbols into a collection. The system also can eliminate symbols that do not have relevance. The system provides the collection to the ECC handling the 911 call and/or the first responder dispatched to the true physical location.

The system can synchronize the time of an event with other events. The request for assistance is a key event that drives the system's searching for a relationship of sensor data (e.g., visual content).

As far as the meaning of symbols to a meaning in a scene or time—and location—bound event goes, that is a matter of pattern matching and training and what is taking place over time.

Some implementations of the AI system involve reinforcement learning through human feedback (RLHF). For example, human trainers can be given access to the model and scenes and can interact with the system to inform it about accuracy.

In some implementations of the learning and training model, the system identifies a data set of objects it has found related in time and location. The system presents the data set of objects to a trainer at a certain sample rate for a training period. The person can provide input about the analysis of the scene.

Over time, based on assessing feedback on meaning to the modeled assessment, the system can learn and improve its ability to determine the meaning of the scene.

The present disclosure generally has been written from the viewpoint of the emergency call setting forth all relevant information in a monologue. In select implementations, the server 200 can perform voice recognition of a dialogue between the emergency calltaker and the caller. For example, the caller might state that an accident occurred "10 minutes ago." Because people commonly use approximate times, the calltaker might check the current time (2:04 pm) and ask the caller to confirm the time of the accident (e.g., "Are you saying the accident occurred at 1:54 pm?"). The caller might reply with another relative time (e.g., "No, 5 minutes before that."). Thus, the system can identify that the accident occurred at 1:49 pm (i.e., 5 minutes before 1:54 pm), rather than 5 minutes before the current time (e.g., 1:59 pm).

Many implementations of the present disclosure ignore stop words, such as "the" and "is," consistent with many natural language processing techniques. Some implementations include negations (e.g., the word "not") in these stop words.

Superficially, ignoring negations significantly alters the meaning of language. However, ignoring negations recognizes the complexity of spoken language, particularly with regard to the tone in which the words are spoken. For example, people sometimes use negation ambiguously (e.g., replying "no" to the question "there are no other people?" to mean "no") and/or sarcastically.

Further, ignoring negation sometimes does not significantly alter the workload. For example, if a caller says that there was a yellow car that was not in the accident, then the workload is only slightly increased by incorrectly returning videos including a yellow car in the accident. In this case, the group of videos including a yellow car—whether in an accident or not—is still significantly smaller than the group of videos entirely without a yellow car.

Some implementations situationally ignore negation. For example, the involvement of a yellow car might be a minor issue, but a direct answer to whether a particular type of assistance is necessary might be a major issue. Thus, particular implementations can form key phrases, based on questions like, "Do we need to dispatch medical assistance?" and answers like, "No."

The conversion of text, video, and voice can remove social biases and can provide custody control via blockchain technology.

In some implementations, the information collection device can be or include a directional microphone.

Figure 5:
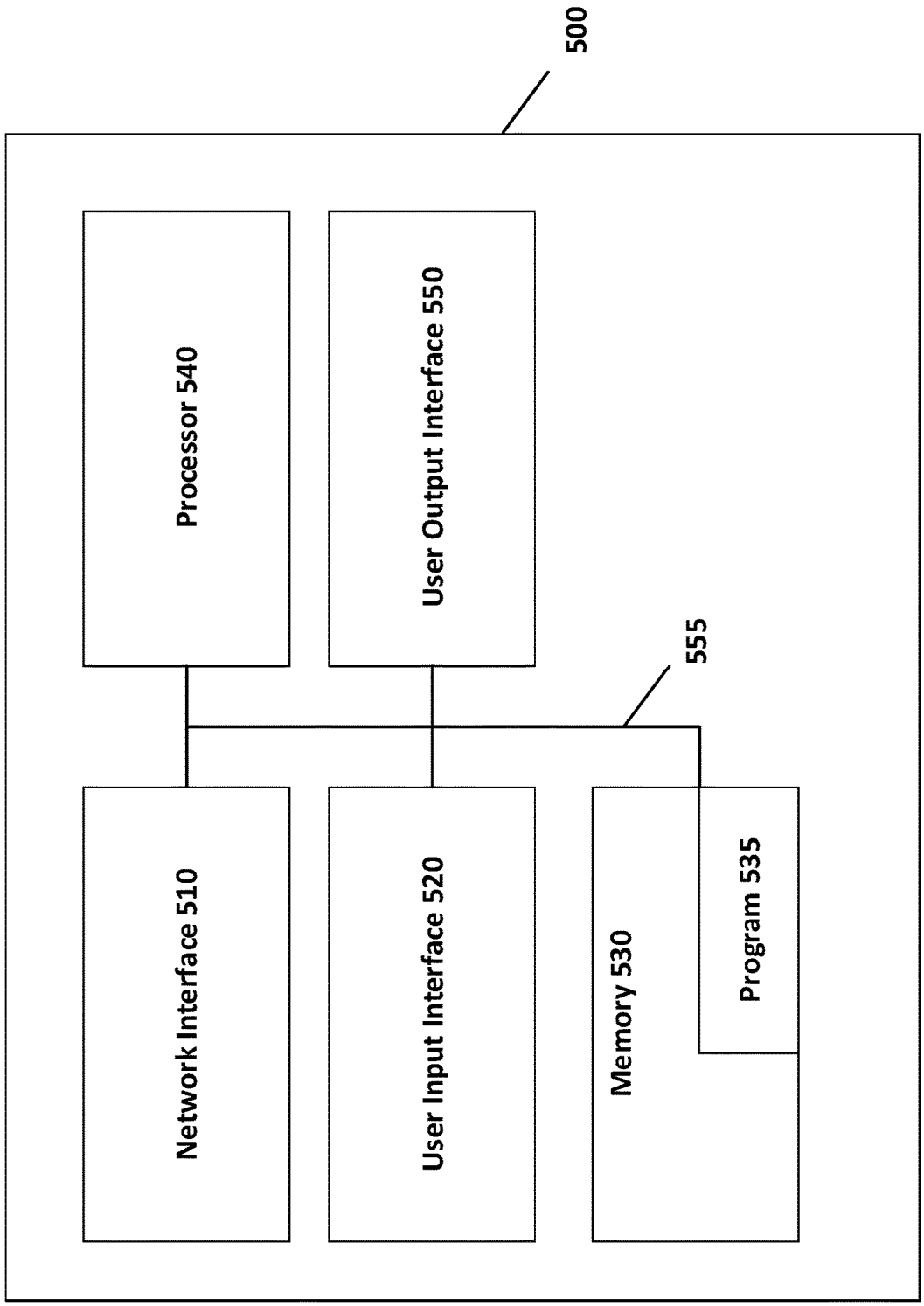
FIG. 5 illustrates a computing device, according to an implementation of the present disclosure.

FIG. 5 illustrates a computing device 500, according to an implementation of the present disclosure. The device 210 and/or the server 220 can be implemented by the computing device 500.

The computing device 500 can include a network interface 510, a user input interface 520, a memory 530, a program 535, a processor 540, a user output interface 550, and a bus 555.

Although illustrated within a single housing, the computing device 500 can be distributed across plural housings or sub-systems that cooperate in executing program instructions. In some implementations, the computing device 500 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, or Linux in many implementations, the system hardware can be configured according to a Symmetric Multi-Processing (SMP) architecture or a Non-Uniform Memory Access (NUMA) architecture.

The network interface 510 provides one or more communication connections and/or one or more devices that allow for communication between the computing device 500 and other computing systems (not shown) over a communication network, collection of networks (not shown), or the air, to support the identification, extracting, and conveying key words, phrases, and meanings in service of emergency voice, text, and video communications, outlined herein. The network interface can communicate using various networks (including both internal and external networks) m such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 520 can receive one or more inputs from a human. The user input interface can be or include a mouse, a touchpad, a keyboard, a touchscreen, a trackball, a camera, a microphone, a joystick, a game controller, a scanner, or any other input device.

The memory 530, also termed a "storage," can include or be one or more computer-readable storage media readable by the processor 540 and that store software. The memory 530 can be implemented as one storage device or across multiple co-located or distributed storage devices or sub-systems. The memory 530 can include additional elements, such as a controller, that communicate with the processor 540. The memory 530 can also include storage devices and/or sub-systems on which data and/or instructions are stored. The computing device 500 can access one or more storage resources to access information to carry out any of the processes indicated in this disclosure and, in particular, FIGS. 2-4. In various implementations, the memory 530 stores the program 535 to execute at least a portion of the algorithms illustrated in FIGS. 2-4. Further, the program 535, when executed by the computing device 500 generally and/or the processor 540 specifically, can direct, among other functions, performance of the operations of identifying, extracting, and conveying key words, phrases, and meanings in service of emergency voice, text, and video communications, as described herein.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 530 can be or include resistive RAM (RRAM) or a magneto-resistive RAM (MRAM). The information being tracked, sent, received, or stored in communication system can be provided in any database, register, table, cache, queue, control list, or storage structure, based on particular implementations, all of which could be referenced in any suitable timeframe.

The processor 540 (e.g., a processing unit) can be or include one or more hardware processors and/or other circuitry that retrieve and execute software, especially the program 530, from the memory 530. The processor 540 can be implemented within one processing device, chip, or package and can also be distributed across multiple processing devices, chips, packages, or sub-systems that cooperate. In some implementations, the processor 540 is or includes a Graphics Processing Unit (GPU).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The user output interface 550 outputs information to a human user. The user output interface 550 can be or include a display (e.g., a screen), a touchscreen, speakers, a printer, or a haptic feedback unit. In many implementations, the user output interface 550 can be combined with the user input interface 520. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the identifying, extracting, and conveying key words, phrases, and meanings in service of emergency voice, text, and video communications, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media). Accordingly, aspects of the present disclosure can take the form of a hardware implementation, a software implementation (including firmware, resident software, or microcode) or an implementation combining software and hardware aspects that can generally be referred to herein as a "module" or a "system." Functions described in this disclosure can be implemented as an algorithm executed by one or more hardware processing units, e.g., the processor 540. In various embodiments, different operations and portions of the operations of the algorithms described can be performed by different processing units. In some implementations, the operations can be achieved by reciprocating software in the device 210, the server 220, and/or the call center, Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 555 can share hardware resources with memory 530 and the processor 540. In this alternative implementation, the computing device 500 be provided with separate hardware resources including one or more processors and memory elements.

In example implementations, various other components of the computing device 500 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 555. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example AM1, a method includes receiving visual content of a physical location, the visual content identified by a content timestamp, the physical location identified by a spatial identifier; receiving audio content of a call; performing voice recognition on the call to extract a first audio symbol; receiving a first timestamp of the call, the first timestamp indicating a time at which the call was initiated or a time extracted from the call by voice recognition; and determining a feature in the visual content, at least in part based on the first audio symbol, the feature defined by a person, object, or situation.

Example AM2 is the method of Example AM1, further comprising: receiving a location of the call, the location being a GPS location of a device that initiated the call or a location identified in the call by voice recognition.

Example AM3 is the method of Example AM2, further comprising: identifying the visual content, based on the location of the call, the GPS location of the visual content, the content timestamp, and the first timestamp of the call.

Example AM4 is the method of any of Examples AM1-AM3, further comprising: determining a relationship between the first audio symbol and a second audio symbol, the second audio symbol extracted from the call by voice recognition.

Example AM5 is the method of any of Examples AM1-AM4, further comprising: annotating the visual content with an identifier of the feature to produce an annotation; and transmitting the visual content and the annotation to an emergency system.

Example AM6 is the method of any of Examples AM1-AM5, further comprising: receiving the spatial identifier, the spatial identifier including GPS coordinates of the physical location.

Example AM7 is the method of any of Examples AM1-AM6, further comprising: receiving a second timestamp of the call, the second timestamp identifying the other of the time at which the call was initiated or the time extracted from the call.

In Example AA1, an apparatus includes a network interface that receives visual content of a physical location and audio content of a call, the visual content identified by a content timestamp, the physical location identified by a spatial identifier; and a processor configured to perform voice recognition on the call to extract a first audio symbol, wherein a first timestamp of the call is received, the first timestamp indicating a time at which the call was initiated or a time extracted from the call by voice recognition, and the processor further is configured to determine a feature in the visual content, at least in part based on the first audio symbol, the feature defined by a person, object, or situation.

Example AA2 is the apparatus of Example AA1, wherein the network interface receives a location of the call, the location being a GPS location of a device that initiated the call or a location identified in the call by voice recognition.

Example AA3 is the apparatus of Example AA2, wherein the processor further is configured to identify the visual content, based on the location of the call, the GPS location of the visual content, the content timestamp, and the first timestamp of the call.

Example AA4 is the apparatus of any of Examples AA1-AA3, wherein the processor further is configured to determine a relationship between the first audio symbol and a second audio symbol, the second audio symbol extracted from the call by voice recognition.

Example AA5 is the apparatus of any of Examples AA1-AA4, wherein the processor further is configured to annotate the visual content with an identifier of the feature to produce an annotation, and the network interface transmits the visual content and the annotation to an emergency system.

Example AA6 is the apparatus of any of Examples AA1-AA5, wherein the network interface receives the spatial identifier, the spatial identifier including GPS coordinates of the physical location.

Example AA7 is the apparatus of any of Examples AA1-AA6, wherein the network interface receives a second timestamp of the call, the second timestamp identifying the other of the time at which the call was initiated or the time extracted from the call.

In Example AC1, a computer-readable medium includes instructions that, when executed by a processor, perform operations comprising: receiving visual content of a physical location, the visual content identified by a content timestamp, the physical location identified by a spatial identifier; receiving audio content of a call; performing voice recognition on the call to extract a first audio symbol; receiving a first timestamp of the call, the first timestamp indicating a time at which the call was initiated or a time extracted from the call by voice recognition; and determining a feature in the visual content, at least in part based on the first audio symbol, the feature defined by a person, object, or situation.

Example AC2 is the medium of Example AC1, the operations further comprising: receiving a location of the call, the location being a GPS location of a device that initiated the call or a location identified in the call by voice recognition.

Example AC3 is the medium of Example AC2, the operations further comprising: identifying the visual content, based on the location of the call, the GPS location of the visual content, the content timestamp, and the first timestamp of the call.

Example AC4 is the medium of any of Examples AC1-AC3, the operations further comprising: determining a relationship between the first audio symbol and a second audio symbol, the second audio symbol extracted from the call by voice recognition.

Example AC5 is the medium of any of Examples AC1-AC4, the operations further comprising: annotating the visual content with an identifier of the feature to produce an annotation; and transmitting the visual content and the annotation to an emergency system.

Example AC6 is the medium of any of Examples AC1-AC5, the operations further comprising: receiving the spatial identifier, the spatial identifier including GPS coordinates of the physical location.

Example AC7 is the medium of any of Examples AC1-AC6, wherein the network interface receives a second timestamp of the call, the second timestamp identifying the other of the time at which the call was initiated or the time extracted from the call.

In Example AF1, an apparatus includes means for receiving visual content of a physical location, the visual content identified by a content timestamp, the physical location identified by a spatial identifier, and for receiving audio content of a call; and means for performing voice recognition on the call to extract a first audio symbol, for receiving a first timestamp of the call, the first timestamp indicating a time at which the call was initiated or a time extracted from the call by voice recognition, and for determining a feature in the visual content, at least in part based on the first audio symbol, the feature defined by a person, object, or situation.

Example AF2 is the apparatus of Example AF1, further comprising: means for receiving a location of the call, the location being a GPS location of a device that initiated the call or a location identified in the call by voice recognition.

Example AF3 is the apparatus of Example AF2, further comprising: means for identifying the visual content, based on the location of the call, the GPS location of the visual content, the content timestamp, and the first timestamp of the call.

Example AF4 is the apparatus of any of Examples AF1-AF3, further comprising: means for determining a relationship between the first audio symbol and a second audio symbol, the second audio symbol extracted from the call by voice recognition.

Example AF5 is the apparatus of any of Examples AF1-AF4, further comprising: means for annotating the visual content with an identifier of the feature to produce an annotation; and means for transmitting the visual content and the annotation to an emergency system.

Example AF6 is the apparatus of any of Examples AF1-AF5, further comprising: means for receiving the spatial identifier, the spatial identifier including GPS coordinates of the physical location.

Example AF7 is the apparatus of any of Examples AF1-AF6, further comprising: means for receiving a second timestamp of the call, the second timestamp identifying the other of the time at which the call was initiated or the time extracted from the call.

In Example BM1, a method includes receiving audio content of a call associated with a physical location; performing voice recognition on the call to extract a first audio symbol; receiving visual content of the physical location; and determining a feature in the visual content, at least in part based on the first audio symbol, the feature defined by a person, object, or situation.

Example BM2 is the method of Example BM1, further comprising: triggering a camera to receive the visual content, at least in part based on a spatial identifier of the physical location.

Example BM3 is the method of Example BM2, further comprising: determining the spatial identifier, at least in part based on an initiating location of the call.

Example BM4 is the method of Example BM2, further comprising: performing voice recognition to extract a spoken location from the call; and determining the spatial identifier, at least in part based on the spoken location.

Example BM5 is the method of any of Examples BM1-BM4, further comprising: transmitting the visual content and an identifier of the feature to an emergency system.

Example BM6 is the method of Example BM5, further comprising: receiving caller location information of the call; comparing location information of the physical location to the caller location information to produce an identified location; annotating the visual content with the identified location to produce an annotation; and transmitting the annotation to the emergency system.

Example BM7 is the method of any of Examples BM1-BM6, further comprising: determining a relationship between the first audio symbol and a second audio symbol, the second audio symbol extracted from the call by voice recognition; and transmitting the relationship in an annotation.

In Example BA1, an apparatus includes a network interface that receives audio content of a call associated with a physical location; and a processor configured to perform voice recognition on the call to extract a first audio symbol, wherein the network interface receives visual content of the physical location, and the processor further is configured to determine a feature in the visual content, at least in part based on the first audio symbol, the feature defined by a person, object, or situation.

Example BA2 is the apparatus of Example BA1, wherein the processor triggers a camera to receive the visual content, at least in part based on a spatial identifier of the physical location.

Example BA3 is the apparatus of Example BA2, wherein the processor further is configured to determine the spatial identifier, at least in part based on an initiating location of the call.

Example BA4 is the apparatus of Example BA2, wherein the processor further is configured to perform voice recognition to extract a spoken location from the call and to determine the spatial identifier, at least in part based on the spoken location.

Example BA5 is the apparatus of any of Examples BA1-BA4, wherein the network interface transmits the visual content and an identifier of the feature to an emergency system.

Example BA6 is the apparatus of Example BA5, wherein the network interface receives caller location information of the call, the processor further is configured to compare location information of the physical location to the caller location information to produce an identified location, the processor further is configured to annotate the visual content with the identified location to produce an annotation, and the network interface transmits the annotation to the emergency system.

Example BA7 is the apparatus of any of Examples BA1-BA6, wherein the processor further is configured to determine a relationship between the first audio symbol and a second audio symbol, the second audio symbol extracted from the call by voice recognition, and the network interface transmits the relationship in an annotation.

In Example BC1, a computer-readable medium includes instructions that, when executed by a processor, perform operations comprising: performing voice recognition on a call to extract a first audio symbol, wherein a network interface receives audio content of the call, the call associated with a physical location, and the network interface receives visual content of the physical location; and determining a feature in the visual content, at least in part based on the first audio symbol, the feature defined by a person, object, or situation.

Example BC2 is the medium of Example BC1, wherein the network interface triggers a camera to receive the visual content, at least in part based on a spatial identifier of the physical location.

Example BC3 is the medium of Example BC2, the operations further comprising: determining the spatial identifier, at least in part based on an initiating location of the call.

Example BC4 is the medium of Example BC2, the operations further comprising: performing voice recognition to extract a spoken location from the call; and determining the spatial identifier, at least in part based on the spoken location.

Example BC5 is the medium of any of Examples BC1-BC4, wherein the network interface transmits the visual content and an identifier of the feature to an emergency system.

Example BC6 is the medium of Example BC5, the operations further comprising: comparing location information of the physical location to caller location information to produce an identified location, wherein the network interface receives the caller location information of the call; and annotating the visual content with the identified location to produce an annotation, wherein the network interface transmits the annotation to the emergency system.

Example BC7 is the medium of any of Examples BC1-BC6, the operations further comprising: determining a relationship between the first audio symbol and a second audio symbol, the second audio symbol extracted from the call by voice recognition; and transmitting the relationship in an annotation.

In Example BF1, an apparatus includes means for receiving audio content of a call associated with a physical location; means for performing voice recognition on the call to extract a first audio symbol; means for receiving visual content of the physical location; and means for determining a feature in the visual content, at least in part based on the first audio symbol, the feature defined by a person, object, or situation.

Example BF2 is the apparatus of Example BF1, further comprising: means for triggering a camera to receive the visual content, at least in part based on a spatial identifier of the physical location.

Example BF3 is the apparatus of Example BF2, further comprising: means for determining the spatial identifier, at least in part based on an initiating location of the call.

Example BF4 is the apparatus of Example BF2, further comprising: means for performing voice recognition to extract a spoken location from the call; and means for determining the spatial identifier, at least in part based on the spoken location.

Example BF5 is the apparatus of any of Examples BF1-BF4, further comprising: means for transmitting the visual content and an identifier of the feature to an emergency system.

Example BF6 is the apparatus of Example BF5, further comprising: means for receiving caller location information of the call; means for comparing location information of the physical location to the caller location information to produce an identified location; means for annotating the visual content with the identified location to produce an annotation; and means for transmitting the annotation to the emergency system.

Example BF7 is the apparatus of any of Examples BF1-BF6, further comprising: means for determining a relationship between the first audio symbol and a second audio symbol, the second audio symbol extracted from the call by voice recognition; and means for transmitting the relationship in an annotation.

We claim:

1. A method, comprising:
receiving audio content of a call associated with a physical location;
performing voice recognition on the call to extract a first audio symbol and a spoken location;
determining a spatial identifier of the physical location, at least in part based on the spoken location;
receiving visual content of the physical location, at least in part based on the spatial identifier; and
determining a feature in the visual content, at least in part based on the first audio symbol, the feature defined by a person, object, or situation.

2. The method of claim 1, further comprising:
triggering a camera to receive the visual content, at least in part based on the spatial identifier of the physical location.

3. The method of claim 2, further comprising:
determining the spatial identifier, at least in part based on an initiating location of the call.

4. The method of claim 1, further comprising:
transmitting the visual content and an identifier of the feature to an emergency system.

5. The method of claim 4, further comprising:
receiving caller location information of the call;
comparing location information of the physical location to the caller location information to produce an identified location;
annotating the visual content with the identified location to produce an annotation; and
transmitting the annotation to the emergency system.

6. The method of claim 1, further comprising:
determining a relationship between the first audio symbol and a second audio symbol, the second audio symbol extracted from the call by voice recognition; and
transmitting the relationship in an annotation.

7. An apparatus, comprising:
a network interface that receives audio content of a call associated with a physical location; and
a processing unit configured to perform voice recognition on the call to extract a first audio symbol and a spoken location and to determine a spatial identifier of the physical location, at least in part based on the spoken location, wherein
the network interface receives visual content of the physical location, at least in part based on the spatial identifier, and
the processing unit further is configured to determine a feature in the visual content, at least in part based on the first audio symbol, the feature defined by a person, object, or situation.

8. The apparatus of claim 7, wherein the processing unit triggers a camera to receive the visual content, at least in part based on the spatial identifier of the physical location.

9. The apparatus of claim 8, wherein the processing unit further is configured to determine the spatial identifier, at least in part based on an initiating location of the call.

10. The apparatus of claim 7, wherein the network interface transmits the visual content and an identifier of the feature to an emergency system.

11. The apparatus of claim 10, wherein
the network interface receives caller location information of the call,
the processing unit further is configured to compare location information of the physical location to the caller location information to produce an identified location,
the processing unit further is configured to annotate the visual content with the identified location to produce an annotation, and
the network interface transmits the annotation to the emergency system.

12. A non-transitory computer-readable medium including instructions that, when executed by a processing unit, perform operations comprising:
performing voice recognition on a call to extract a first audio symbol and a spoken location, wherein a network interface receives audio content of the call, the call associated with a physical location;
determining a spatial identifier of the physical location, at least in part based on the spoken location, wherein the network interface receives visual content of the physical location, at least in part based on the spatial identifier; and
determining a feature in the visual content, at least in part based on the first audio symbol, the feature defined by a person, object, or situation.

13. The medium of claim 12, wherein the network interface triggers a camera to receive the visual content, at least in part based on the spatial identifier of the physical location.

14. The medium of claim 13, the operations further comprising:
determining the spatial identifier, at least in part based on an initiating location of the call.

15. The medium of claim 12, wherein the network interface transmits the visual content and an identifier of the feature to an emergency system.

16. The medium of claim 15, the operations further comprising:
comparing location information of the physical location to caller location information to produce an identified location, wherein the network interface receives the caller location information of the call; and
annotating the visual content with the identified location to produce an annotation, wherein the network interface transmits the annotation to the emergency system.

17. The medium of claim 12, the operations further comprising:
determining a relationship between the first audio symbol and a second audio symbol, the second audio symbol extracted from the call by voice recognition; and
transmitting the relationship in an annotation.

18. The method of claim 1, further comprising:
extracting at least one frame of the visual content, at least in part based on the feature; and
transmitting the at least one frame of the visual content.

19. The apparatus of claim 7, wherein the processing unit further is configured to extract at least one frame of the visual content, at least in part based on the feature, and the network interface transmits the at least one frame of the visual content.

20. The medium of claim 12, the operations further comprising:

extracting at least one frame of the visual content, at least in part based on the feature, wherein the at least one frame of the visual content is transmitted by a computing device including the processing unit.

* * * * *